April 21, 1953 R. C. EDWARDS 2,635,571
APPARATUS FOR MANUFACTURING HELICALLY FINNED TUBES
Filed March 30, 1948 6 Sheets-Sheet 1
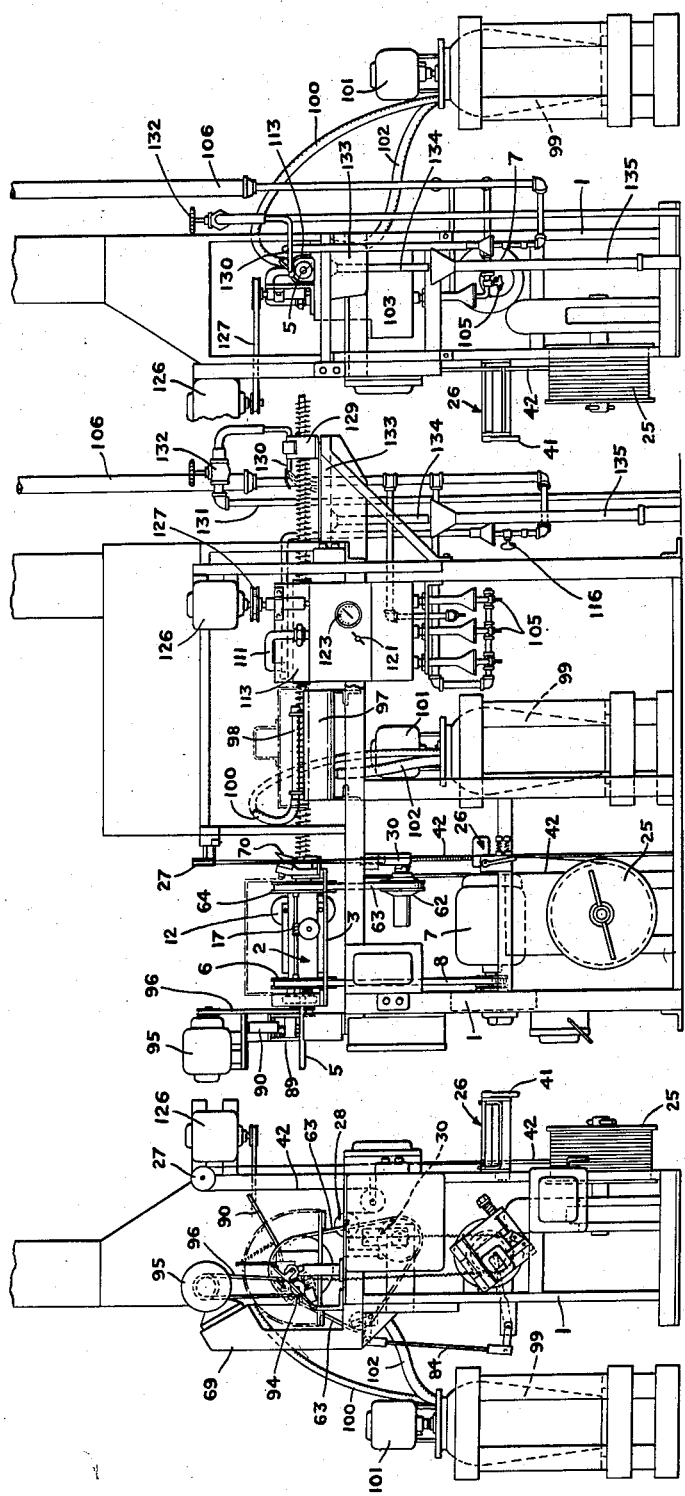
RAY C. EDWARDS
INVENTOR.

April 21, 1953  R. C. EDWARDS  2,635,571
APPARATUS FOR MANUFACTURING HELICALLY FINNED TUBES
Filed March 30, 1948  6 Sheets-Sheet 2

RAY C. EDWARDS
*INVENTOR.*

BY [signature]
*attorney*

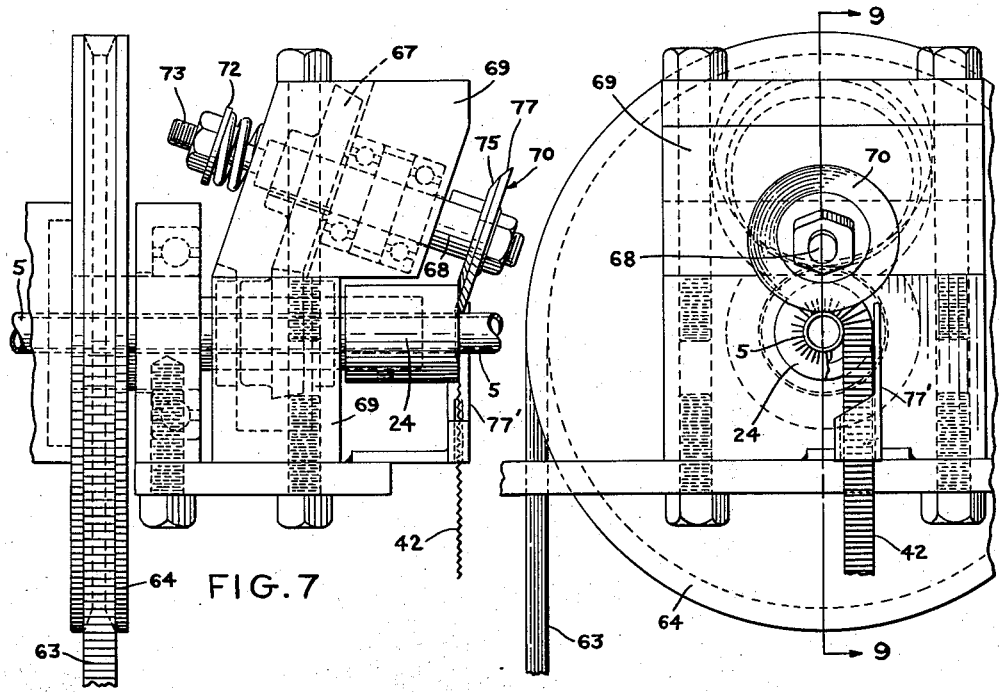
FIG. 7
FIG. 8
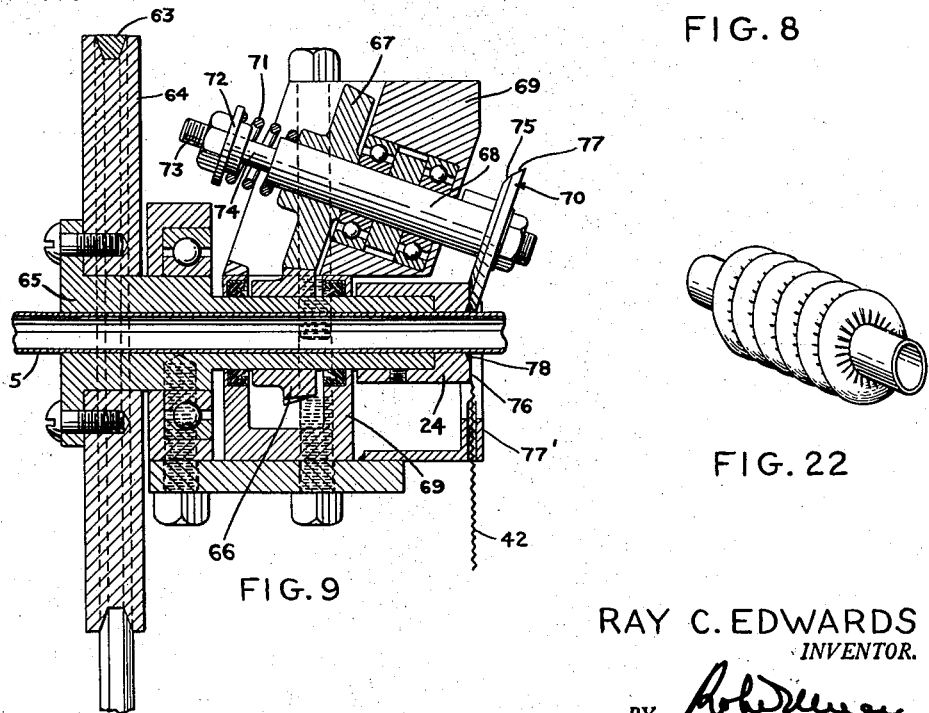
FIG. 9
FIG. 22
RAY C. EDWARDS
INVENTOR.

April 21, 1953 R. C. EDWARDS 2,635,571
APPARATUS FOR MANUFACTURING HELICALLY FINNED TUBES
Filed March 30, 1948 6 Sheets-Sheet 4
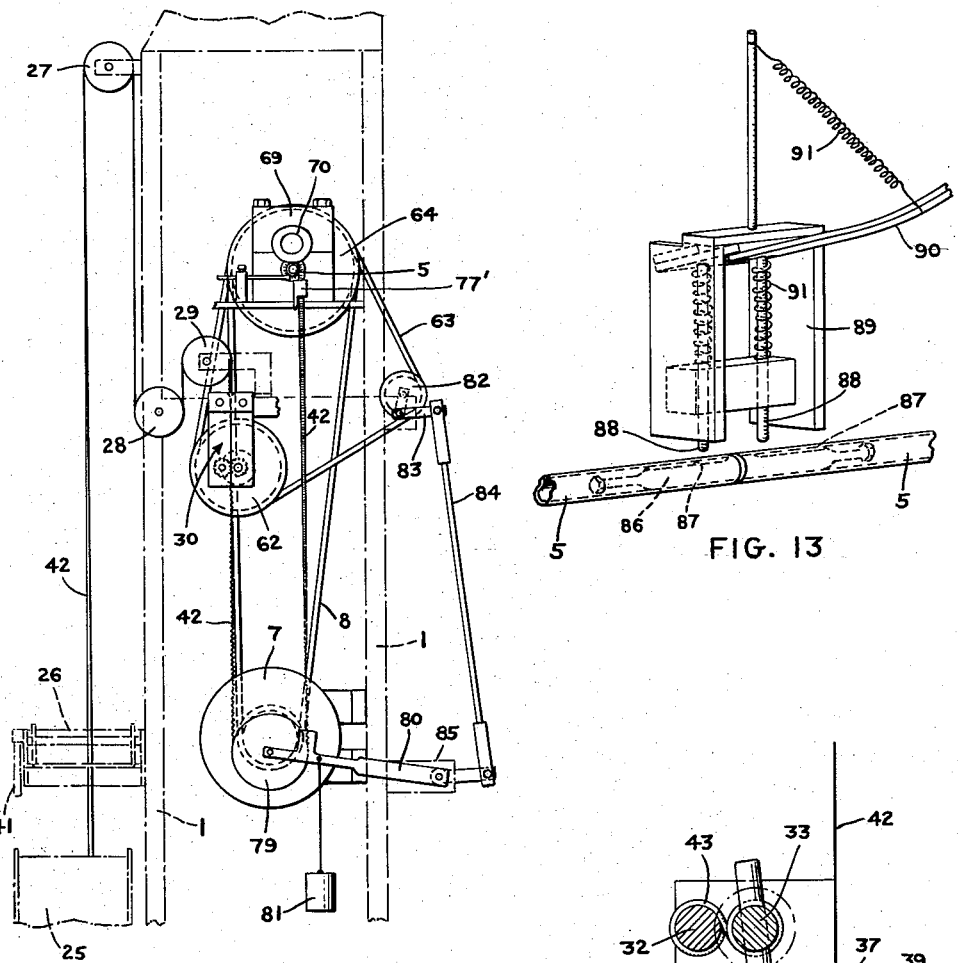
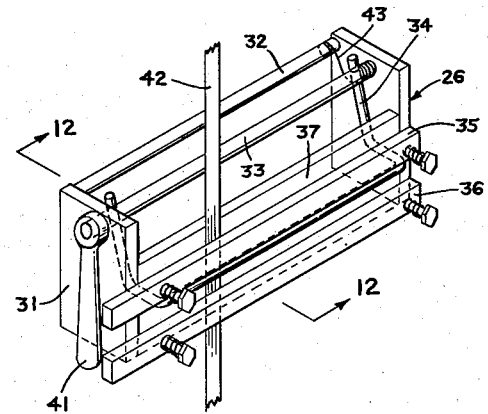
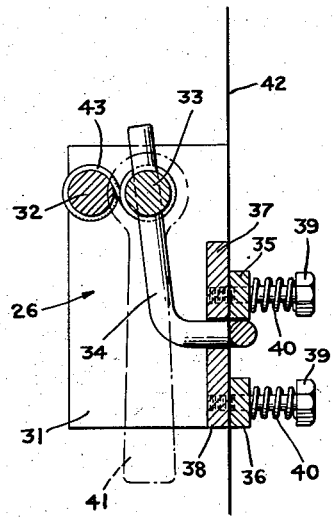
RAY C. EDWARDS
INVENTOR.
BY *Rob Meyer*
*Attorney*

April 21, 1953     R. C. EDWARDS     2,635,571
APPARATUS FOR MANUFACTURING HELICALLY FINNED TUBES
Filed March 30, 1948     6 Sheets-Sheet 5
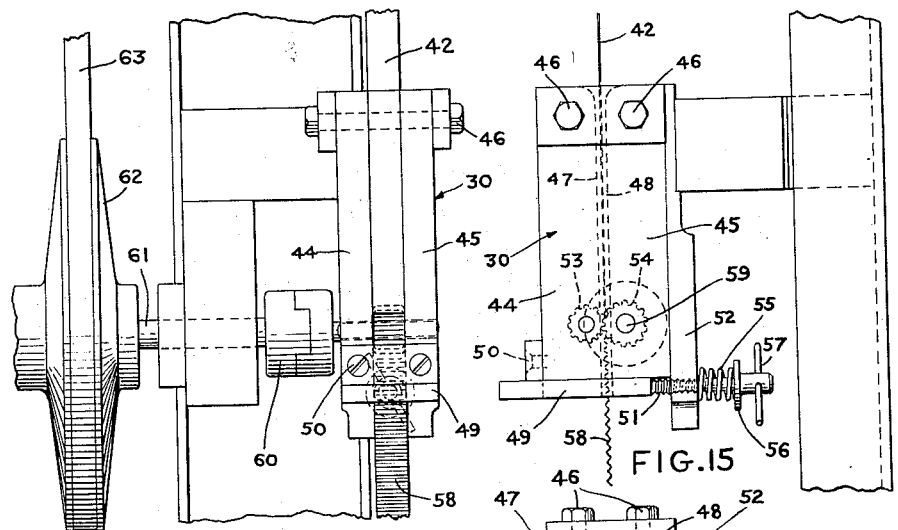
FIG. 14
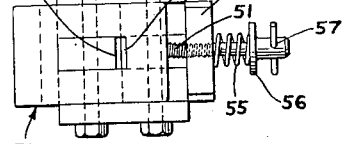
FIG. 15
FIG. 16
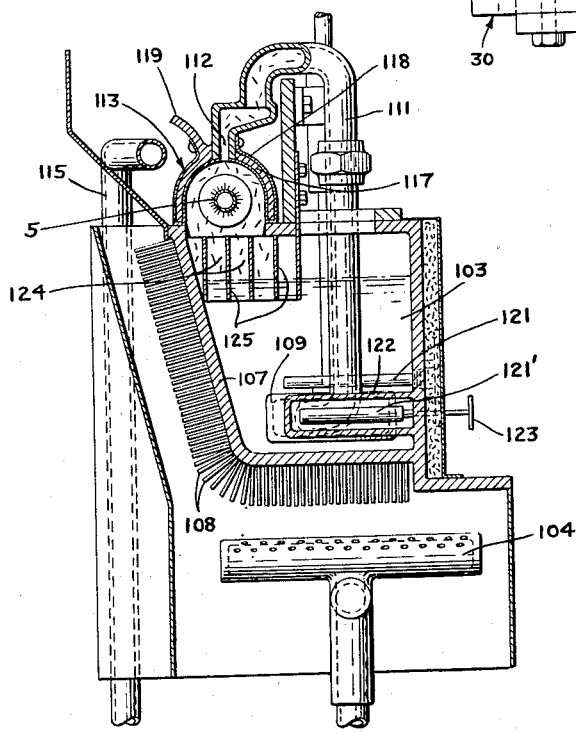
FIG. 21
RAY C. EDWARDS
*INVENTOR.*
BY
*Attorney*

April 21, 1953  R. C. EDWARDS  2,635,571
APPARATUS FOR MANUFACTURING HELICALLY FINNED TUBES
Filed March 30, 1948  6 Sheets-Sheet 6
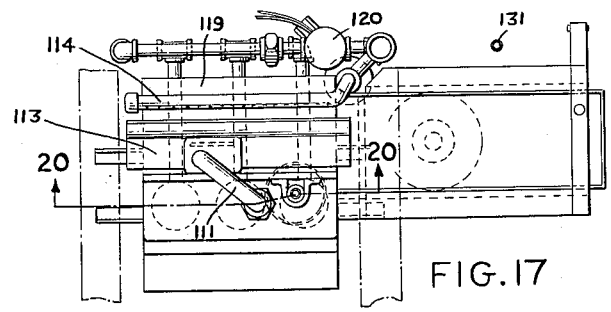
FIG. 17
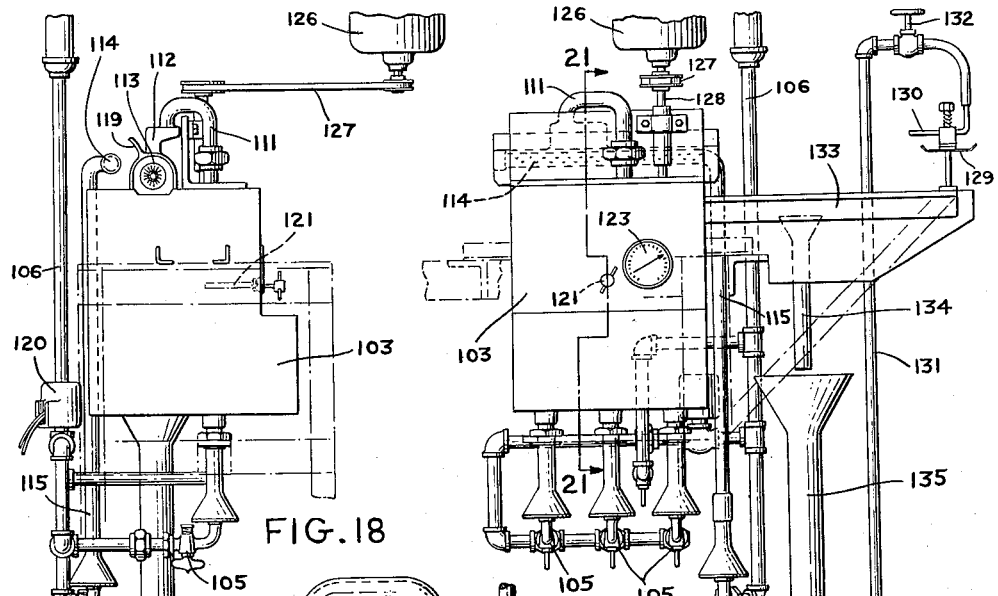
FIG. 18
FIG. 19
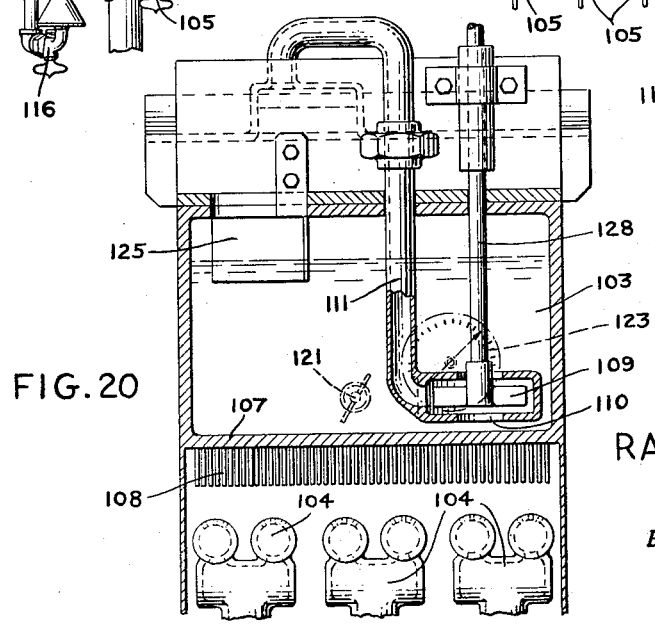
FIG. 20
RAY C. EDWARDS
INVENTOR.

Patented Apr. 21, 1953

2,635,571

UNITED STATES PATENT OFFICE 2,635,571

APPARATUS FOR MANUFACTURING HELICALLY FINNED TUBES

Ray C. Edwards, Glen Rock, N. J.

Application March 30, 1948, Serial No. 17,983

2 Claims. (Cl. 113—1)

This invention relates to apparatus for manufacturing helically-finned tubes by winding upon a tube a finned-forming metal ribbon and bonding the wound ribbon to the tube by soldering.

An object of the present invention is to provide apparatus by means of which helically-finned tubes may be manufactured in one continuous operation at greater speeds than has heretofore been possible, with a minimum requirement of manpower and, consequently, at lower cost than heretofore.

The present invention comprehends the employment of such apparatus as novel means for rotating and feeding longitudinally, the tube upon which the fin-forming metal ribbon is wound; novel means for crimping the metal ribbon and ironing it as it is wound upon the tube; means for synchronizing operation of the crimping and ironing means; means for spraying molten solder under pressure upon the tube and fin wound thereon to bond them together, with other novel features as will appear from the following specification.

With these and other objects in view, as may appear from the accompanying specification, the invention consists of various features of construction and combination of parts, which will be first described in connection with the accompanying drawings, showing an apparatus for manufacturing helically-finned tubes of a preferred form embodying the invention, and the features forming the invention will be specifically pointed out in the claims.

In the drawings:

Figure 1 is a side elevation of the fin-applying machine.

Figure 2 is an end view of the fin-applying machine looking towards the tube inlet end thereof.

Figure 3 is an end view of the fin-applying machine looking towards the tube outlet end thereof.

Figure 7 is a side elevation of the fin-applying mechanism.

Figure 8 is an end view of the fin-applying mechanism.

Figure 9 is a longitudinal section through the fin-applying mechanism.

Figure 10 is a detailed view in end elevation showing the fin-forming ribbon feeding and crimping means.

Figure 11 is a perspective view of the tensioning means for tensioning the fin-forming ribbon during its feeding movement to the fin-applying mechanism.

Figure 12 is a cross section taken on line 12—12 of Figure 11.

Figure 13 is a perspective view showing the manner of connecting two succeeding tubes for continuous feeding through the fin-applying machine.

Figure 14 is a side elevation of the fin-forming ribbon crimping mechanism.

Figure 15 is an edge view of the fin-forming ribbon crimping mechanism.

Figure 16 is a top plan view of the fin-forming ribbon crimping mechanism.

Fig. 17 is a top plan of the solder-applying structure.

Figure 18 is an end view of the solder-applying structure.

Figure 19 is a side elevation of the solder-applying structure.

Figure 20 is a vertical section through the solder-applying structure and taken on line 20—20 of Figure 17.

Figure 21 is a vertical cross section through the solder-applying structure taken on the line 21—21 of Figure 19.

Figure 22 is a perspective view of a fragment of a finned tube made by the apparatus.

Figure 4:
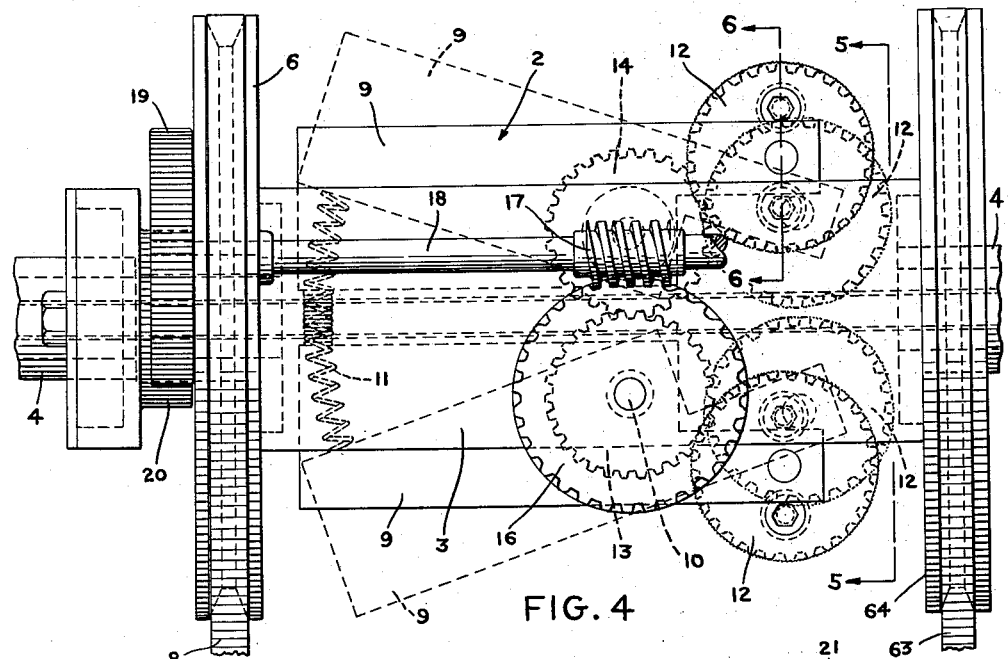
Figure 4 is a side elevation of the tube-feeding and rotating mechanism.
Figures 5, 6:
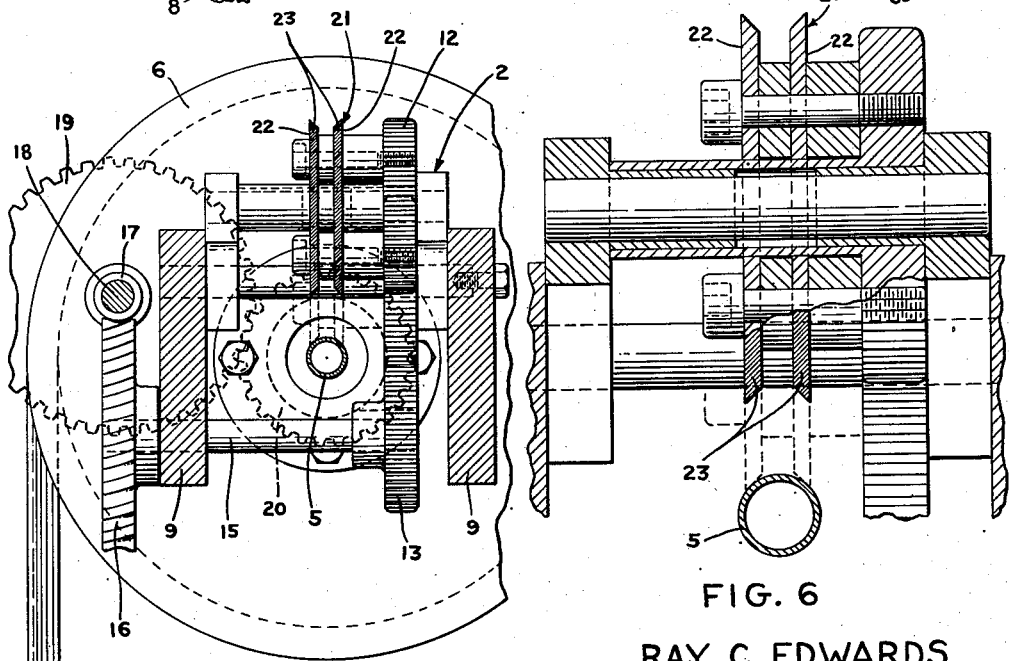
Figure 5 is a cross section through the tube-feeding and rotating mechanism and taken on the line 5—5 of Figure 4.
Figure 6 is a fragmentary section through the tube feeding and rotating mechanism and taken on the line 6—6 of Figure 4.

Referring more particularly to the drawings, the improved apparatus or machine for forming helically-wound finned tubes includes a supporting frame structure 1 which carries at the tube inlet end mechanism 2 for rotating a tube upon which the fin is wound and feeding it longitudinally through the machine. This mechanism is shown specifically in Figures 4, 5, and 6 of the drawings and it includes a carrying frame 3 which is rotatably supported from the supporting structure 1 by suitable bearings 4 which are hollow to permit a tube, indicated at 5, upon which the fin is to be wound, to pass longitudinally through the bearings and through the rotatable carrying-frame 3. The frame 3 has a grooved sheave 6 attached thereto which is driven from a motor or other suitable prime mover 7 by a V-belt 8 for rotating the carrying frame 2 about its axis. The carrying frame 2 has a pair of gear-carrying counter-weight blocks 9 pivotally connected thereto as shown at 10 and the outer counter-weight ends of these blocks are urged apart by a suitable spring 11. The counter-weight blocks 9 have gears 12 rotatably supported on the opposite sides of their pivots from the spring-engaged ends of the counter-weights. The gears 12 are supported for rotary movement and mesh respectively with a primary driving gear 13 and a secondary driving gear 14. The gear 13 is carried by a shaft 15 which in turn is driven by a worm gear 16. The worm gear 16 meshes with a worm 17 carried by a shaft 18. A gear 19 is mounted on the shaft 18, is connected to the sheave 6 and meshes with a stationary gear 20 carried by one of the bearing structures for the frame 3. Thus, as the frame 3 is rotated, the shaft 17 will be rotated on an axis parallel to but independent of the axis of rotation of the frame 3. The rotation of the shaft 18 will be imparted to the gears 12 through the worm 17, worm gear 16, shaft 15 and gears 13 and 14.

Each of the gears 14 has a tube-feeding roller 21 attached thereto for rotation therewith. The feeding rollers 21 comprise a pair of spaced discs 22, each of which has their perimeters cut at substantially an angle of 45°, oppositely to each other so as to present, in effect, a frustro-triangular perimeter for the feeding rolls. The oppositely inclined perimetral faces of the discs 22 are serrated, as shown at 23 in Figure 5 of the drawings, to provide roughened surfaces for engagement with a smooth tube 5 to feed the tube 5 longitudinally through the feeding and rotating mechanism or structure 2. The serrations 23 extend angularly across the perimeters of the discs 22 so as to provide the progressive forward movement of a tube 5 as they are rotated, and the spring 11 together with the counter-weight ends of the members 9 forces the serrated perimeters of the discs 22 into gripping, feeding engagement with a tube. The tube feeding discs 22 are spaced upon opposite sides of a perpendicular plane by checking the longitudinal axis of the tube 5 as it is fed through the carrying frame 3 and engage the tube 5 due to their angular serrated faces 23 on opposite sides of the axis of the tube, as clearly shown in Figure 6 of the drawings, so that the tube 5 will be rotated with rotation of the carrying frame 3 as the tube is fed longitudinally through the frame.

The tube 5 upon which the fin is to be wound passes from the outlet end of the feeding and rotating structure 2 through an anvil 24 as clearly shown in Figures 7 and 9 of the drawings, and it is at this point that the fin-forming metal ribbon is wound about the tube.

The fin-forming metal ribbon, which comes from the manufacture wound upon spools, as shown in dotted lines at 25 in Figure 10 of the drawings, is smooth and it passes from the spool 25 through a straightening and tensioning structure 26 over suitable guiding rollers 27, 28 and 29 to the crimping mechanism 30.

The ribbon tensioning device 26 is attached to the supporting frame 1 at any suitable point and it comprises a supporting frame 31 including a cross bar 32. A rod 33 is pivotally connected to the frame 31 and carries a U-shaped frame 34 which, in turn, carries the tensioning bars 35 and 36. The tensioning bars 35 and 36 are yieldably supported, being connected to the stationary tensioning bars 37 and 38 by suitable bolts 39. Springs 40 are wound about the bolts 39 and engaging the tensioning bars 36 for urging them against the stationary tensioning bars 37 and 38. A handle 41 is connected to the rod 33 to permit manual movement of the tensioning bars 35 and 36 away from the stationary tensioning bars 37 and 38 to permit the fin-forming metal ribbon 42 to be inserted between the movable tensioning bars 35 and 36 and the stationary tensioning bars 37 and 38. A spring 43 is wound about the stationary bar 32 and the pivoted bar 33 to prevent wobbling or vibration of the bar 33.

The crimping mechanism 30 includes a ribbon guiding structure including a pair of guide members 44 and 45 which are pivotally supported at their upper ends by suitable bolts 46 and which are provided with cooperating facing longitudinally-extending recesses 47 and 48 which cooperate to form a guide for the fin-forming metal ribbon 42 during its crimping operation. The pivotally supported guide bars have their lower ends engaged by an adjusting plate 49 which is attached, as indicated at 50, to the guide member 44. The adjusting plate 49 has a threaded stud 51 connected thereto which is threadably engaged in a plate 52 which bears against the guide member 45. By adjustment of the threaded stud 51 the crimping gears 53 and 54 which are carried by the guide members 44 and 45, respectively, may be moved towards each other into ribbon-crimping position or away from each other to permit the feeding of the end of a metal ribbon 42 between them. A spring 55 is coiled about the stud 51. One end of the spring engages the plate 52 while the other end of the spring engages a stop plate or disc 56 carried by the stud 51. Suitable means, as indicated at 57, is mounted on the stud 51 to facilitate its rotation. The fin-gripping gears or rolls 53 and 54 which are carried by the guiding members 44 and 45 have their perimeters fluted so as to provide the proper desired crimping of the fin 42 completely across the entire width of the fin-forming metal ribbon 42, as shown at 58 in Figures 14 and 15.

The crimping roll 54 is mounted upon a shaft 59 which is connected by a coupling structure 60 to a shaft 61. The shaft 61 has a variable pitch sheave 62 mounted thereon and a driving belt 63 passes about this sheave 62. The driving belt 63 also passes about a sheave 64 which is attached to the sleeve 65 which carries the anvil 24 and through which the tube 5 passes as it leaves the rotating and feeding mechanism 2. The sleeve 65 has a gear 66 mounted thereon which meshes with a gear 67 carried by a shaft 68. The shaft 68 and the sleeve 65 are rotatably supported by a suitable stationary bracket structure 69 and while the gears 66 and 67 are held against longitudinal movement relative to their respective carries, namely, the sleeve 65 and shaft 68, the shaft 68 is mounted for limited longitudinal axial movement relative to the stationary supporting bracket 69.

An ironing roller 70 is carried by the shaft 68 and it cooperates with the anvil 24 in the winding of the fin-forming metal ribbon 42 on the tube 5. The iron roller 70 is urged against the face of the anvil 24 by a spring 71 coiled about the shaft 68 and having one end abutting the hub of the gear 67, while the other end abuts an abutment collar 72 which is adjustable upon the threaded end 73 of the stud 74 formed on the end of the shaft 68 for regulating the tension of the spring 71.

The ironing roller 70 has its perimeter cut at two different angles, the inner portion 75 of the fin or ribbon-engaging surface of the ironing roller 70 is cut at an angle substantially parallel to the flat face 76 of the anvil 24, while the outer portion 77 is cut at a less acute angle so that it will project at an acute angle from the face 76 of the anvil 24. The face 76 of the anvil 74 has an annular recess cut therein, the inner face of which extends at an acute angle to the face 76 of approximately the same degree as which the angled portion 77 of the face of the iron roller 70 extends with respect to the face 76 of the anvil 24.

As the crimped fin-forming metal ribbon approaches the ironing roller 70 and anvil 24, it is guided to an abrupt turn at approximately 90° by the guide 77' so that the crimps in the metal ribbon spread out in a fanwise manner, that is, the inner parts of the crimps close to the tube 5 are accentuated, while those near the outer edge of the ribbon are spread apart and are ironed out by the ironing roller 70 and anvil 24. This permits relatively deep spring-like crimps which give stability and relatively large contact surface area between the inner edge of the metal ribbon and the tube 5. The guide 77' also prevents the fin-forming metal ribbon 42 from backing away from the tube 5 during the winding of the metal ribbon 42 upon the tube 5.

The crimped fin-forming metal ribbon is engaged between the ironing roller 70 and the face 76 of the anvil 24 and the pressure of the angle portion 75 of the iron roller 70 against the crimped fin-forming ribbon 42 and pressing it against the face 76 of the anvil will iron out the crimps in the outer edge portion of the ribbon at it is helically wound upon the tube 5. The fin-forming metal ribbon 42 will be helically wound in edgewise engagement with the tube 5 as the tube 5 is fed longitudinally, while rotating, through the anvil 24, and the frictional engagement of the ironing roller 70 and anvil 24 with the fin-forming metal ribbon 42 is such as to cause the feeding of the ribbon from its spool and its winding about the tube 5. The angularly disposed faces of the recess 78 and that of the ironing roller 70 will leave the crimps in the crimped ribbon at the portion of the ribbon immediately surrounding the tube 5 so as to properly tension and support the fin on the tube 5 and provide increased surface contact between the edge of the ribbon and the outer surface of the tube 5.

The recess 78 in the outer end or face 76 of the anvil 24 and the angle of the face 77 of the ironing roller 70 are at angles sufficient to form a cavity at the periphery of the ironing roller 70 of sufficient depth to receive the accentuated crimps at the inner edge portion of the metal ribbon 42, which are formed by the winding of the ribbon about the tube.

The fin-forming metal ribbon 42 is properly tensioned between the crimping structure 30 and iron and applying structure which winds it upon the tube 5 by a suitable tensioning mechanism, including a roller 79 over which the crimped ribbon passes. This guiding roller 79 is rotatably supported by a pivoted arm structure 80 and it is tensioned by a weight 81.

An idler tensioning sheave 82 engages the V-belt 63 between the variable pitch sheave 62 and sheave 64. The idler pulley 82 is pivotally supported by a linkage structure 83 which is, in turn, pivotally connected to the linkage structure 84 at one end and to a suitable support 85 at the opposite end so that it is free to move and effect synchronization between the operation of the crimping rolls 53 and 54 and the ironing roller 70 through the medium of the variable pitch sheave 62 so as to maintain proper coordination and synchronization between the crimping of the fin-forming metal ribbon 42 and winding of the ribbon upon the tube 5. The sheave 62 being a variable pitch sheave, of any approved construction which may be purchased upon the open market, its effective pitch diameter will be automatically adjusted in accordance with variations in the tension of the belt 63 by action of the idler 82, and thus as the idler moves under varying conditions of operation, the effective pitch diameter of the sheave 62 will be automatically adjusted to maintain synchronization between operation of the crimping rolls 53 and 54 and the ironing roller 70.

For the purpose of facilitating the winding of the fins upon the tubes, that is, provide continuous, uninterrupted operation of the apparatus means are provided for connecting the ends of successive tubes fed through the machine, and such means is shown in Figure 13 of the drawings.

The means for connecting the adjacent ends of two successive tubes 5 comprises a coupling member 86 which has a major diameter substantially equal to the interior diameter of the tubes so that it may be inserted into adjacent ends of the two tubes. The coupling member 86 has longitudinally-extending recesses 87 in its perimeter and after it has been inserted in the adjacent ends of tubes slight indentations are made in the tubes to force small portions of them into the indentations 87 so as to prevent slippage between the two tubes. The indentations (not shown) are made in the tubes by means of two plungers 88 which are supported by a suitable supporting structure 89 and are forced manually into denting position with the tubes by means of a hand-operated lever 90 which is pivoted in any suitable manner (not shown) to the supporting structure 89. The plungers 88 are urged out of tube indenting position by suitable springs 91.

A rotary cleaning brush 94 is rotatably supported on the frame 1 of the machine immediately in advance of the entrance to the tube rotating and feeding mechanism 2. This brush is rotated by a motor 95 through suitable power transmission 96 and it is located to brush the outer surface of the tube 5 for cleaning as the tube passes through the rotating and feeding machanism 2.

After the tube upon which the fin-forming ribbon has been helically wound leaves the rotating and feeding mechanism and the fin-applying mechanism it passes over a trough 97 above which is mounted a spray head 98. The spray head 98 is connected to a container 99 for acid or flux by a suitable flexible conduit 100. The acid or flux is pumped from the container 99 by any suitable type of pumping mechanism (not shown) which is operated by the motor 101. A flexible conduit 102 connects the bottom of the trough 97 with the container 99 for returning the excess acid or flux back to the container 99 for re-use.

After the acid or flux has been sprayed upon the tube 5 and the fin wound thereon, it passes to the bonding mechanism which constitutes means for applying molten solder under pressure to the tube and fin for completely coating them with a thin thermal transfer bond so that the tube and fin becomes, in effect, a single unit for heat transfer.

The solder-applying mechanism includes a solder pot 103 in which solder is mounted through the medium of heat supplied by burners 104. Gas flow to the burners 104 is controlled by suitable valves 105 from a gas supply pipe 106. The wall 107 of the solder pot 103 which is contacted by the flames from the burners 104 is provided with a plurality of heat-radiating fins 108.

A centrifugal pump 109 of any approved construction is mounted in the solder pot 103 and has its intake 110 opening into the pot near the bottom thereof for drawing molten solder from the pot. The centrifugal pump 109 discharges the molten solder under pressure through a conduit 111 which discharges the molten solder through an elongated spray slot 112 upon the tube 5 and the fin wound thereon as the tube moves in rotating and longitudinal movement beneath the outlet of the spray slot 112. The spray lot 112 opens into the splash guard 113 through which the finned tube passes, as is clearly shown in Figure 21.

The splash guard 113 is heated by an elongated burner 114 which extends longitudinally therealong and the burner 114 receives gas or other suitable fuel from the main line 106 through a supply line 115 under control of a valve 116.

It is necessary for economical and efficient operation of the bonding or solder-applying structure that the splash guard 113 be a good heat conductor so that it may be maintained at a temperature sufficient to prevent solder from freezing on the inner surface of the splash guard when it is thrown off the tube and fin thereon by centrifugal force occasioned by the rotation of the tube and fin. Metal, such as copper, which is a good heat conductor is subject to rapid corrosion by the flux contained in the solder mixture so that if the guard were made wholly of copper it would be practically eaten away in a relatively short period. Therefore, to provide a splash guard structure which not only will be a good heat conductor but will be highly resistant to corrosion the guard is made with a core 117 of copper or other metal having high thermal heat transfer properties and it is covered on the inside and outside with a covering 118 of stainless steel, "monel" metal or other similar metal of low heat transfer properties but of high resistance to corrosion. The core 117 of the splash guard 113 has a heat transfer flange or fin 119 formed thereon against which the flame from the burner 114 impinges so as to provide for the proper heating of the splash guard.

In Figure 18, an electrically operated valve mechanism of any approved type, which may be purchased upon the open market, is shown at 120, connected in the gas supply line 106 and if it is desired this valve mechanism 120 may be controlled by a thermal bulb 121 of any approved construction which may be purchased upon the open market. Thermal bulb 121 is inserted in a compartment formed by a protective housing 122 in the solder pot 103 so that the amount of gas fed to the burners 104 may be controlled by the thermal bulb 121, if it is so desired. The thermal bulb 121 has a thermometer dial 123 connected thereon as shown in Figures 19, 20 and 21, to permit visible reading of the temperature of the solder and control of the flow of gas to the burners 104 by manual manipulation of the valves 105.

The hot molten solder sprayed under pressure provided by the centrifugal pump 109 upon the rotating tube 5 with the fin wound thereon is heated to a predetermined degree so that its viscosity will permit it to flow freely over the entire exposed surfaces of the tube 5 and fin and the rotating action of the tube and fin will tend to assist in the distribution of the molten solder over the tube and fin and to throw off by centrifugal force any excess solder deposited upon the tube and fin. The excess solder thrown off will strike the inner surface of the heated splash guard 113 and will fall therefrom through the distributing passages 124 into the solder pot 103 where it will be reheated. The distribution passages 124 are formed by suitable baffles 125.

The impeller of the centrifugal pump 109 may be rotated in any suitable manner, but in the drawings it is shown as rotated by operation of an electrical motor 126 through suitable power transmission 127 and shaft 128.

As the fin soldered tube leaves the solder-applying mechanism, it is guided by a yieldably mounted guide member 129 to prevent wobbling or flopping of the end of the tube, and it is sprayed with a spray of relatively cool water through a pipe or nozzle 130, so as to wash the tube and cool it. The water for spraying upon the fin soldered tube is supplied from any suitable source (not shown) through a pipe 131 under control of a valve 132. The water, after it passes over the finned tube, falls into a trough 133 and drains out of the trough through suitable drains 134 and 135 to waste.

Generically, the operation of the mechanism is as follows:

A tube on which the helical fin is to be applied has one end inserted into the inlet end of the rotating and feeding mechanism 2 and as it is pushed into this end sufficiently far to be gripped by the rotating feeding discs or rollers 21 it is cleaned externally by rotary brush 94. As the tube progresses longitudinally through the feeding and rotating means, the end of the crimped fin-forming ribbon which is gripped between the ironing roller 70 and the anvil 24 contacts the outer surface of the tube and the rotary longitudinal movement of the tube, together with the action of the ironing roller 70 and the anvil 24 causes the tensioned helical winding of the ribbon about the tube to form the helically wound fin upon the tube. The ironing roller and anvil cooperate to iron out the crimps in the portion of the fin near its perimeter and leave them on the inner portion of the ribbon or fin which contains the tube. The tube with the fin wound thereon is then sprayed by the soldering flux or acid, after which it passes into and through the splash guard 113 wherein the molten solder is sprayed over the tube under pressure from the centrifugal pump 109. The solder forms a complete thermal transfer bond between the fin and the tube and also prevents accidental displacement of the fin relative to the tube. After the fin and tube have been bonded by the solder they are washed and cooled by the spray of water sprayed thereon. Continuous uninterrupted operation of the apparatus is provided by connecting a successive tube to the end of one passing through the machine or apparatus by means of the bonding or coupling element 88 in the manner heretofor described, and also described in the specification. Mechanism is provided to maintain the proper tension on the fin-forming metal ribbon during its crimping operation and during its travel to the ironing roller 70 and anvil 24, and also mechanism is provided for synchronizing the operation of the ironing roller and the crimping roll so as to prevent undesirable stretching or slack in the fin-forming metal ribbon as it is fed to and helically wound upon the tube.

It will be understood that the invention is not to be limited to the specific construction or arrangement of parts shown, but that they may be widely modified within the invention defined by the claims.

What is claimed is:

1. In an apparatus for manufacturing helically finned tubes, crimping rolls for crimping a metal fin forming ribbon, means for helically winding the crimped metal ribbon upon a tube, a rotatable ironing roller and a rotatable anvil for ironing out portions of the crimps in the metal ribbon inwardly of its perimetrical edge as it is wound upon the tube, and means to effect synchronization between the operation of the crimping rolls and the ironing roller and anvil comprising, a sheave rotatable with said ironing roller and anvil, a variable pitch sheave for rotating said crimping rolls, a belt about said sheaves, and a movably supported idler sheave engaging said belt.

2. In an apparatus for manufacturing helically finned tubes, crimping rollers of uniform diameter across their entire crimping faces, means for feeding a fin forming metal ribbon between said rollers to crimp the metal ribbon in substantially parallel crimps across the entire width of the metal ribbon, means for helically winding the crimped metal ribbon edgewise on a tube including means for rotating the tube upon which the metal ribbon is to be wound, means for feeding the tube longitudinally through the rotating means, means for guiding and tensioning the metal ribbon as it is wound upon a tube, an anvil, a motor driven ironing roller cooperating with said anvil, a motor for rotating said roller, said anvil and ironing roller cooperating to wind said crimped metal ribbon upon a tube, said ironing roller and anvil having parts of their metal ribbon engaging surfaces smooth and shaped to iron the crimps out of a portion of the metal ribbon inwardly of its perimeter whereby the outer portion of the ribbon will be in effect elongated to cause a tight hugging of the inner portion of the ribbon against the tube, means for rotating one of said crimping rollers, and means connecting said ironing roller rotating means and said crimping roller rotating means for synchronizing the operations of said crimping rollers and ironing roller comprising, a sheave rotatable with said ironing roller, a variable pitch sheave for rotating said crimping rolls, a belt about said sheave, and a movably supported idler sheave engaging said belt.

RAY C. EDWARDS.

References Cited in the file of this patent

UNITED STATES PATENTS

| Number | Name | Date |
|---|---|---|
| 1,472,719 | Horvath | Oct. 30, 1923 |
| 1,570,117 | Zimmermann | Jan. 19, 1926 |
| 1,732,415 | Owston | Oct. 22, 1929 |
| 1,829,202 | Vance | Oct. 27, 1931 |
| 1,830,357 | Gortner | Nov. 3, 1931 |
| 1,840,317 | Horvath | Jan. 12, 1932 |
| 2,101,929 | Boerger | Dec. 14, 1937 |
| 2,152,437 | Lear | Mar. 28, 1939 |
| 2,178,671 | Osborn | Nov. 7, 1939 |
| 2,251,642 | Tilley | Aug. 5, 1941 |
| 2,408,322 | Lear | Sept. 24, 1946 |
| 2,437,500 | Bruegger | Mar. 9, 1948 |
| 2,532,239 | Newlin | Nov. 28, 1950 |